United States Patent
Grosse et al.

(10) Patent No.: US 11,693,815 B2
(45) Date of Patent: Jul. 4, 2023

(54) SYSTEM FOR DATA TRANSMISSION AND VALVE SYSTEM

(71) Applicant: Buerkert Werke GmbH & Co. KG, Ingelfingen (DE)

(72) Inventors: Kersten Grosse, Ingelfingen (DE); René Bachmann, Ingelfingen (DE)

(73) Assignee: Buerkert Werke GmbH & Co. KG, Ingelfingen (DE)

( * ) Notice: Subject to any disclaimer, the term of this patent is extended or adjusted under 35 U.S.C. 154(b) by 0 days.

(21) Appl. No.: 17/223,759

(22) Filed: Apr. 6, 2021

(65) Prior Publication Data
US 2022/0245087 A1    Aug. 4, 2022

(30) Foreign Application Priority Data
Feb. 3, 2021   (DE) .................... 10 2021 102 522.2

(51) Int. Cl.
*G06F 13/20* (2006.01)
*G06F 13/42* (2006.01)
*G06F 13/38* (2006.01)
*G06F 13/40* (2006.01)

(52) U.S. Cl.
CPC ........ *G06F 13/4282* (2013.01); *G06F 13/385* (2013.01); *G06F 13/4045* (2013.01)

(58) Field of Classification Search
None
See application file for complete search history.

(56) References Cited

U.S. PATENT DOCUMENTS

| | | | | |
|---|---|---|---|---|
| 4,694,390 A * | 9/1987 | Lee | .................... | G05B 23/0283 700/45 |
| 6,427,129 B1 * | 7/2002 | Laila | ..................... | G01D 3/022 702/88 |
| 6,704,899 B1 * | 3/2004 | Dold | ........................ | H04L 1/00 714/752 |
| 8,342,478 B1 * | 1/2013 | Cordray | ................ | F16K 31/055 251/129.03 |
| 2015/0270954 A1 * | 9/2015 | Gross | .................... | H04L 9/0618 380/28 |
| 2015/0372865 A1 * | 12/2015 | Schmirler | ............. | H04L 9/3265 709/221 |
| 2016/0363655 A1 * | 12/2016 | Fensterle | ................. | G01S 17/04 |
| 2017/0212265 A1 * | 7/2017 | Nakayama | ......... | H03K 17/9545 |
| 2021/0301940 A1 * | 9/2021 | Fontaine | ............ | G05B 23/0235 |

* cited by examiner

*Primary Examiner* — Henry Tsai
*Assistant Examiner* — Dean Phan
(74) *Attorney, Agent, or Firm* — Dilworth IP, LLC

(57) ABSTRACT

A system for data transmission between two devices, including an output device having a binary output interface and a first field device having a binary input interface connected in a signal-transmitting manner to the binary output interface via a unidirectional connection. The output device includes a signal processing module which is set up to convert a data set to be transmitted to a binary, discrete-time signal in accordance with a serial protocol. The first field device includes a signal processing module which is set up to convert the received binary, discrete-time signal to the data set in accordance with the serial protocol. The invention further relates to a valve system.

6 Claims, 2 Drawing Sheets

SYSTEM FOR DATA TRANSMISSION AND VALVE SYSTEM

FIELD OF THE DISCLOSURE

Figure 1:
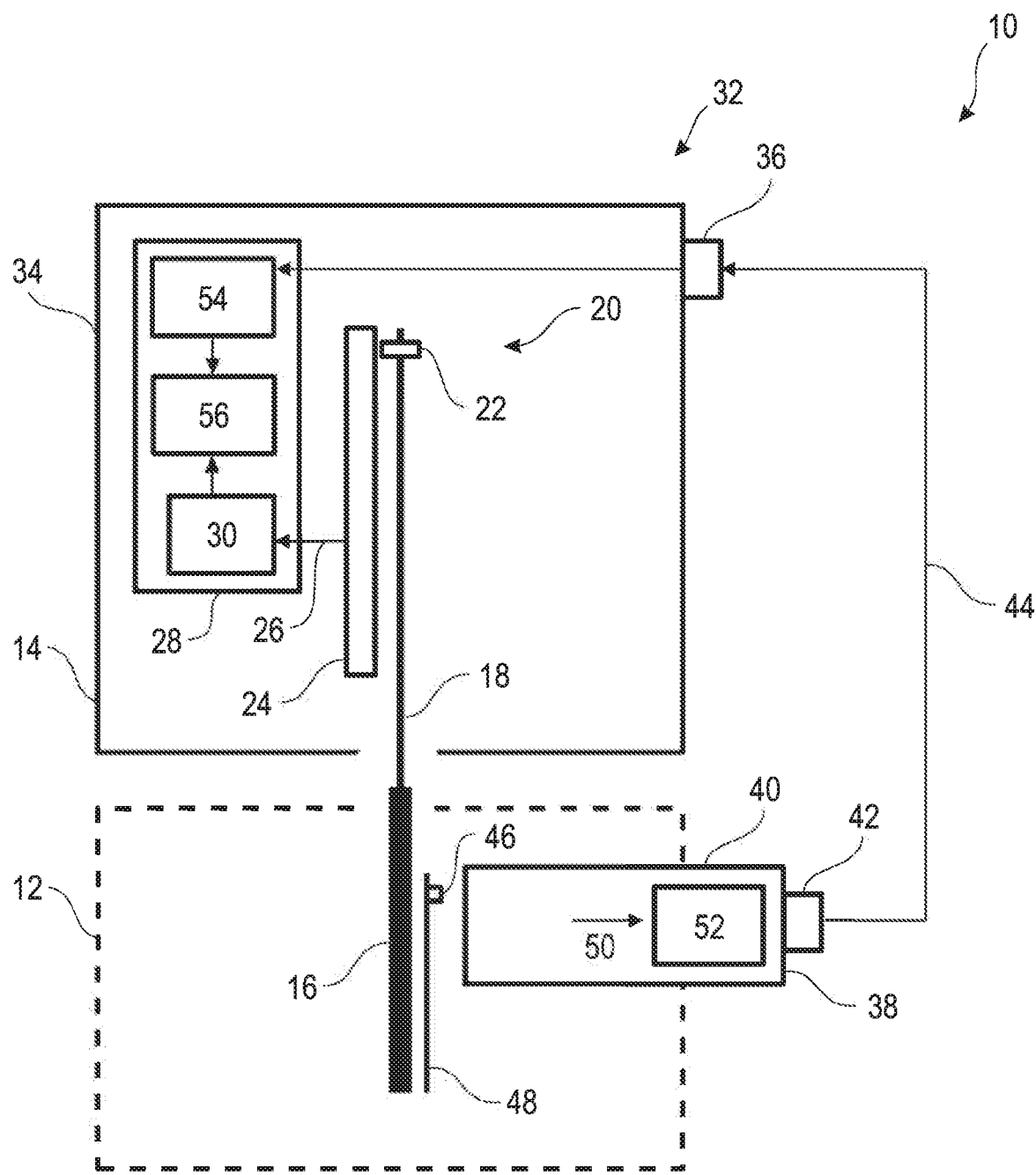

The invention relates to a system for data transmission between two devices. The invention further relates to a valve system having a system for data transmission.

BACKGROUND

Valve systems having a process valve are known from the prior art. The valve position of the process valve, i.e. the respective position or location of the process valve, is detected by means of a displacement measurement system. The displacement measurement system may be configured as an analogue displacement measurement system in which a corresponding measured value for individual positions, also referred to as valve positions, is sensed. The valve positions are usually at least the closed valve position and the open valve position. They may however also be intermediate positions of the process valve, i.e. positions between the open valve position and the closed valve position. In a training phase, which is also referred to as "teaching" operation, the detected valve positions are usually taught with a certain tolerance range. In the training phase, the end positions are typically used, i.e. the open valve position and the closed valve position, and one or two further intermediate positions. In the training phase, the detected valve positions are then compared with the real lift range of the process valve.

The feedback of additional values occurring, for example, for further positions or locations of the process valve on a further valve component, in particular on further moving valve components, is performed via an external discrete feedback signal of a feedback means, for example a binary signal, i.e. a logical one or a logical zero. To this end, it is however necessary that the feedback means has been positioned and adjusted mechanically as precisely as possible with respect to the further valve component to be able to provide a correct feedback signal. One example for a further position is a specific valve position in case of a specific function, for example in case of a cleaning lift. Here, the valve takes a position outside the open valve position and the closed valve position.

It turned out to be disadvantageous that the positioning and adjustment of the feedback means are time-consuming and prone to errors.

The object of the invention is to permit a simplified and process-reliable putting into operation and feedback.

SUMMARY

According to the invention, the object is achieved by a system for data transmission between two devices, in particular two devices of a valve system. The system comprises an output device having a binary output interface and a first field device having a binary input interface which is connected in a signal-transmitting manner to the binary output interface via a unidirectional connection. The output device includes a signal processing module which is set up to convert a data set to be transmitted to a binary, discrete-time signal in accordance with a serial protocol. The first field device includes a signal processing module which is set up to convert the received binary, discrete-time signal to the data set in accordance with the serial protocol.

The invention further relates to a valve system having a system for data transmission, in particular a system of the previously mentioned type. The valve system comprises a process valve having a control head and a further valve component, in particular a valve spindle or a valve spindle system, to which a detection means, in particular a proximity switch, is assigned, the detection means having a binary output interface. The control head has a binary input interface which is connected in a signal-transmitting manner to the binary output interface via a unidirectional connection. The detection means includes a signal processing module which is set up to convert a data set to be transmitted to a binary, discrete-time signal in accordance with a serial protocol. The control head includes a signal processing module which is set up to convert the received binary, discrete-time signal to the data set in accordance with the serial protocol.

The output device, for example the detection means or the proximity switch, thus constitutes the signal or data source, whereas the first field device, for example the control head of the process valve constitutes the associated signal or data sink. It is thus possible that the binary, discrete-time signal, i.e. a corresponding bit sequence, is transmitted from the output device to the first field device in a unidirectional manner, i.e. only in one direction, namely from the output device to the first field device. To this end, the output device includes the corresponding signal processing module which first converts an analogue measured signal or a detected analogue measured value to the digital signal, i.e. the bit sequence or the binary, discrete-time signal. The digital signal is then transmitted from the binary output interface of the output device to the binary input interface of the first field device via the unidirectional connection. The first field device includes the corresponding signal processing module which is set up to convert the digital signal, i.e. the bit sequence or the binary, discrete-time signal, back again to the data set to obtain the corresponding information.

The signal processing module, among other things, may comprise a processor such as a microprocessor, and software which is executed by the processor.

In this respect, it is possible that despite the binary input interface of the first field device, complex information for example in the form of an analogue measured value can be transmitted accordingly. The system for data transmission can thus ensure that more complex information than only two different states, namely a logical zero and a logical one, is transmitted between the respective devices.

The data transmitted from the output device to the first field device can accordingly be read in there, wherein the data can be accordingly complex information.

It is in particular thus possible that the positioning and adjustment of a feedback means constituting the corresponding output device must no longer be performed in a precise manner, as it is now sufficient to perform a rough positioning and adjustment of the feedback means, as it transmits a digital signal to the first field device which however receives analogue information, i.e. correspondingly complex information such as the analogously detected measured value.

For example, the output device configured as a feedback means transmits via the binary output interface a measured value which may correspond to a distance value (for example the distance of a sensor to a transducer), the measured value being adapted to be used for a teaching similarly to the signal of an internal displacement measurement system.

Basically, the field device is a device in automation technology, in particular a sensor or an actuator in automation technology. The field device may be connected to further field devices and/or to an automation device, for example a stored programmed control (SPS), via a field bus or Real Time Ethernet.

One aspect provides that the signal processing module of the output device is set up to encode the data set and/or that the signal processing module of the first field device is set up to decode the binary, discrete-time signal. The complex information on which the data set is based, for example in the form of an analogue measured value, can accordingly be encoded by the signal processing module of the output device, the encoding determining the corresponding bit sequence.

The signal processing module of the first field device knows the corresponding encoding such that the signal processing module of the first field device can decode the received binary, discrete-time signal, i.e. the bit sequence. The complex information on which the data set is based can thus be transmitted to the first field device by means of the binary signal.

The data set or the complex information involves, for example, analogue measured valves which may be different depending on the state of the system to be measured, for example of the process valve.

A further aspect provides that the output device includes an analogue sensor which is set up to output an analogue value, in particular a current value, a voltage value or a frequency value. The output device is set up to convert the analogue value generated by the analogue sensor to the binary, discrete-time signal. In this respect, it is possible that the analogue sensor transfers information according to an analogue signal to the field device, as the analogue measured value, for example in the form of the current value, the voltage value or the frequency value, is converted to the binary, discrete-time signal. In contrast thereto, a threshold value, e.g. a current threshold value which makes a distinction between the logical zero and the logical one, is provided in the prior art. The analogue sensor may have a current interface (for example a so-called 4-20-mA-interface) or a voltage interface (for example a so-called 0-10-V-interface), the output value of which is converted to the binary, discrete-time signal by the signal processing module.

According to the invention, it is therefore possible to transmit complex information, since the specifically detected analogue value, e.g. the current value of the analogue sensor can be transmitted to the first field device by means of the binary, discrete-time signal, i.e. not only the information whether the threshold value, e.g. the current threshold value, has been reached or exceeded or not, which corresponds to the logical zero and the logical one, respectively.

The output device may be a second field device, in particular a detection means or a proximity switch, for example an IO-Link device. The data transmission can thus take place between two field devices having binary interfaces which are configured as a binary input interface in the first field device and as a binary output interface in the second field device, since a unidirectional connection is provided between the two field devices, such that the binary, discrete-time signal is exclusively transmitted from the second field device to the first field device.

Basically, the respective binary interface may be configured so as to be adapted to be used for bidirectional communication. According to the invention, the corresponding interface is however set up so as to serve only for unidirectional communication. Therefore, the binary interface also involves an output interface or an input interface, wherein exclusively the unidirectional connection is present between the interfaces, i.e. precisely no bidirectional connection.

The intrinsically bidirectional interface of the IO-Link device is in particular merely operated as a binary output interface, i.e. only for unidirectional communication. The corresponding means or configuration of the interface can be realized by an appropriate adaptation of the software (and optionally additionally of the hardware) of the respective device.

The binary interfaces are for example set up or modified using the software of the devices, such that the interfaces are configured as the binary output interface and the binary input interface. An adaptation of the hardware is not performed such that the devices can further be operated as bidirectional devices in another mode of operation.

In this respect, the output device and/or the first field device can have a first mode of operation in which the unidirectional communication is provided, and a second mode of operation in which a bidirectional communication is provided, for example with a further device. It is possible to switch between the two modes of operation.

The software of the appropriate device operates the respective interface in a different manner depending on the mode of operation.

In the first mode of operation, the software of the output device operates the interface of the output device such that it acts only as a binary output interface. Furthermore, the software of the first field device operates the interface of the first field device in the first mode of operation such that it acts only as a binary input interface.

In the first mode of operation, the output device therefore has the binary output interface since the corresponding interface is operated in this way, and the first field device has the binary input interface since the corresponding interface is operated in this way. The unidirectional connection between the devices is thus achieved.

The IO-Link device includes a corresponding IO-Link interface. An IO-Link proximity switch if for example involved.

Basically, the IO-Link represents a standardized IO-technology by means of which a point-to-point communication is possible. IO-Link is field bus-independent, wherein IO-Link can be integrated into different field buses.

The IO-Link device however has a binary interface which is used to transmit complex information on which the data set is based to the first field device via the binary, discrete-time signal.

In this respect, the output device, in particular the IO-Link device, and the first field device have been modified to allow communication of the complex information on which the data set is based via the unidirectional connection, in that the data set is converted to the bit sequence prior to transmission and the received bit sequence is converted again to the data set. Data from a (modified) binary field device, in particular an IO-Link device, can thus be transmitted to a (modified) binary interface of the first field device and be read-in there.

The respective binary interface may be an interface according to industry standard, for example a conventional binary initiator interface.

Basically, it is thus possible that simple field devices are replaced with complex field devices, for example IO-Link devices which have been modified accordingly.

The modification involves the corresponding device, for example the field device, being set up such that the otherwise bidirectional interface is operated exclusively as a unidirectional interface, i.e. only in one direction. Accordingly, the corresponding interface is operated, for example, only as a binary output interface, so that corresponding data is transmitted in a binary, discrete-time and unidirectional manner to the binary input interface of the other device.

In other words, an intrinsically complex device, for example the IO-Link device, is modified or set up, in particular on the software side, such that the complex interface is configured for communication with a simple initiator input. The receiver-side device must also be set up accordingly, for example on the software side.

In this respect, the two devices are set up in terms of the software (and optionally the hardware) thereof so as to form the unidirectional connection via the bidirectional interfaces, so that the interface of the first device acts as a binary input interface and the interface of the second device acts as a binary output interface.

In this respect, the correspondingly modified output devices, in particular the modified complex field devices such as IO-Link devices, are able to communicate with correspondingly modified field devices, i.e. the first field device.

The first field device may be a control head for a process valve, for example a control head of a process valve of a valve system. In this respect, the system for data transmission may be part of the valve system.

Basically, the first field device and the output device, in particular the second field device, may be complex field devices, i.e. an IO-Link device having an appropriate signal processing module.

The first field device and/or the output device can therefore include the signal processing module which is set up, configured or modified accordingly.

Here and in the following, a "module" in general and the signal processing module in particular are to be understood as appropriate hardware and/or software set up to fulfill a specific functionality. In particular, this is to be understood as a combination of suitable hardware and software. The hardware may here comprise, for example, a CPU, a GPU, an FPGA, an ASIC or other types of circuits.

The software may be signal processing software executed on or by the hardware, in particular the processor.

In particular, the signal processing module of the output device is set up to encode the data set or to convert the data set to the binary, discrete-time signal. In the binary, discrete-time signal, levels or voltages correspond to a pure binary signal, for example.

For this purpose, the signal processing module of the output device, for example the signal processing software, is designed such that the signal processing module, for example the hardware such as a driver circuit, implements a simple (serial) protocol on the unidirectional link.

The binary, discrete-time signal may be a pulse width modulation (PWM) signal or a frequency modulation (FM) signal, or may correspond to a digital protocol.

The signal processing module of the first field device may be set up to decode the binary, discrete-time signal or to convert the binary, discrete-time signal to the data set.

The information contained in the binary, discrete-time signal, i.e. the data set is transmitted using the serial protocol to the binary input interface of the first field device the signal processing module of which receives the binary, discrete-time signal and evaluates the serial protocol to obtain the data set, i.e. the complex information.

Basically, the serial protocol may be a simple protocol, for example the "American Standard Code for Information Interchange" (ASCII).

One aspect provides that the valve system, in particular the control head comprises a control and/or evaluation unit which is connected to the binary input interface in a signal-transmitting manner. The control and/or evaluation unit in particular includes the signal processing module. The signal processing module is set up to convert the received binary, discrete-time signal to the data set in accordance with the serial protocol. The control and/or evaluation unit may be a superordinated control and/or evaluation unit of the valve system receiving the signals of a plurality of subordinated systems.

The control and/or evaluation unit may comprise a plurality of processing modules to which specific processing tasks are assigned, in particular with regard to the received signals. The control and/or evaluation unit is therefore set up to analyze the bit sequence to obtain the complex information.

A further aspect provides that the valve system has a displacement measurement system which is assigned to the valve spindle, the displacement measurement system being set up to output a measuring signal depending on the position of the process valve. The displacement measurement system is a displacement measurement system which is provided to detect the location of the process valve on the basis of the position of the valve spindle. The displacement measurement system may have been taught in the conventional way during a training phase, so that it has already learned at least the open position and the closed position, respectively, of the process valve.

The control and/or evaluation unit is in particular set up to translate the measuring signal received from the displacement measurement system in a valve position of the process valve. To this end, the control and/or evaluation unit can include an appropriate displacement measurement processing module which is provided for evaluating the measuring signal received from the displacement measurement system to thus obtain the valve positon of the process valve.

A further aspect provides that the control and/or evaluation unit is set up to process the measuring signal received from the displacement measurement system and the data set converted from the binary, discrete-time signal in accordance with the serial protocol. To this end, the control and/or evaluation unit may include a learning processing module which receives the signal from the displacement measurement system processing module and the signal processing module. The learning processing module can process and use the corresponding information to learn the corresponding positions of the process valve. The information of the displacement measurement system processing module and of the signal processing module can also be compared with each other to thus ensure a redundancy.

As the detection means or the proximity switch, i.e. the output device, transmits complex information to the control and/or evaluation unit, in particular the signal processing module, it is not necessary to adjust the detection means, the proximity switch or the output device as precisely as possible. Due to the complex information, it is actually possible to establish a corresponding relationship with the actual position of the process valve, in particular of the further valve component, the valve spindle or the valve spindle system, for example.

Therein and in the following, the terms "module" and "unit" are understood to describe suitable hardware, suitable software, or a combination of hardware and software that is configured to have a certain functionality.

The hardware may, inter alia, comprise a CPU, a GPU, an FPGA, an ASIC, or other types of electronic circuitry.

BRIEF DESCRIPTION

Figure 2:
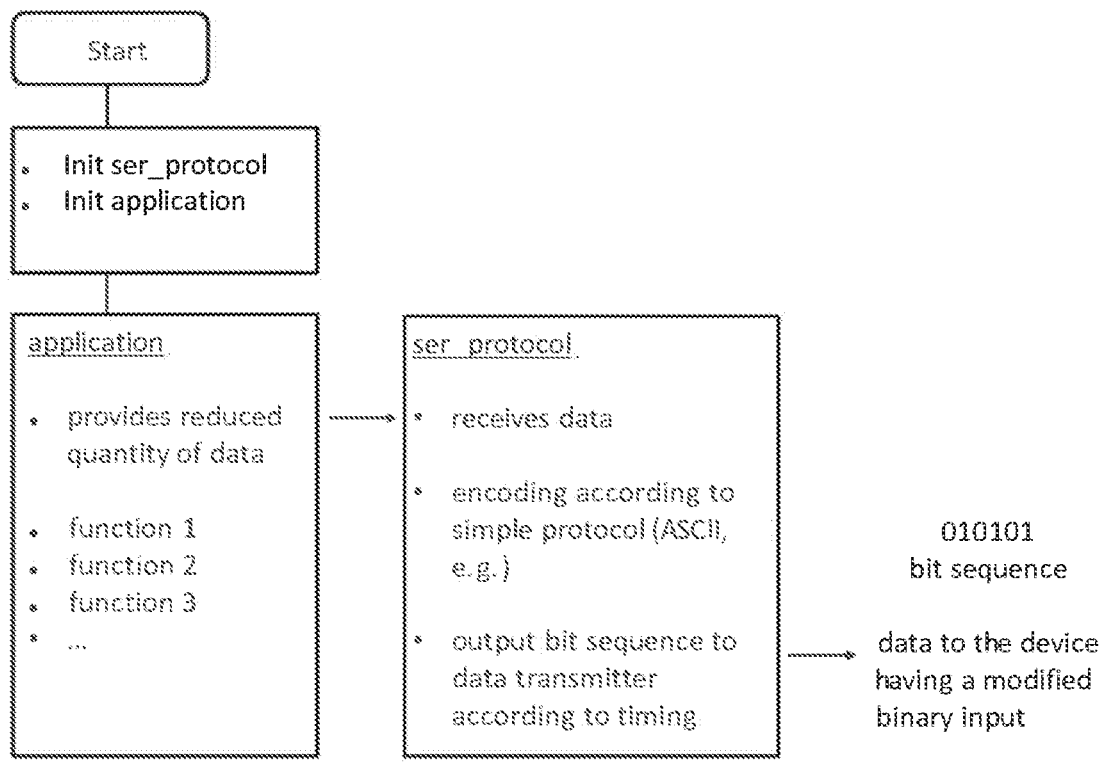
Figure 3:
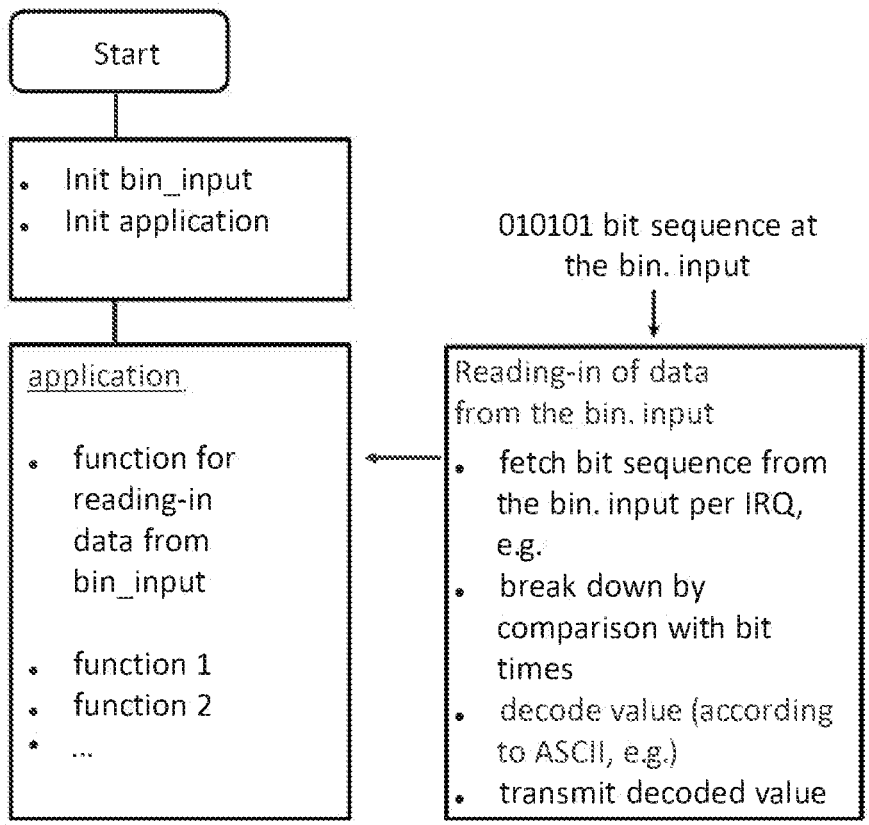

Further advantages and properties of the invention will become apparent from the description below and from the drawings to which reference is made and in which:

FIG. 1 shows a schematic representation of a valve system according to the invention which comprises a system for data transmission according to the invention, FIG. 2 shows an overview showing the communication between the devices of the system for data transmission according to the invention, and FIG. 3 shows a further overview which illustrates the data transmission between the two devices of the system for data transmission according to the invention.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

FIG. 1 shows a valve system 10 which comprises a process valve 12 and a control head 14.

The process valve 12 has a valve spindle 16 which is formed as a piston rod. The valve spindle 16 has a measuring section 18 which is for example formed as a prolongation. The measuring section 18 projects into the control head 14.

The valve system 10 further comprises a displacement measurement system 20 by means of which the position of the process valve 12, in particular of the valve spindle 16 can be detected. The displacement measurement system 20 is for example an analogue displacement measurement system which provides an analogue measured value for the position of the process valve 12 or the valve spindle 16.

The displacement measurement system 20 includes a transducer 22 which is assigned to the valve spindle 16 and is in particular arranged on the measuring section 18. Furthermore, the displacement measurement system 20 includes a sensor 24 which interacts with the transducer 22, in that the sensor 24 receives corresponding signals of the transducer 22 which permit to draw a conclusion about the location or position of the process valve 12.

To this end, the displacement measurement system 20 outputs a measuring signal 26 which depends on the respective position of the process valve 12. The measuring signal 26 is transmitted to a control and/or evaluation unit 28 provided in the control head 14.

The control and/or evaluation unit 28 includes a displacement measurement system processing module 30 which receives and processes the corresponding measuring signal 26 from the displacement measurement system 20 to draw a conclusion about the valve position of the process valve 12 on the basis of the received measuring signal 26.

In a training phase, the control and/or evaluation unit 28, in particular the displacement measurement system processing module 30 has learned which measuring signal 26 involves which position of the process valve 12. Usually, at least the open position and the closed position of the process valve 12 are trained.

The valve system 10 further comprises a system 32 for data transmission between two devices, of which one is the control head 14.

The control head 14 is for example configured as a first field device 34 which has a binary input interface 36 via which the first field device 34 or the control head 14 can receive a corresponding binary, discrete-time signal.

The second device of the system 32 is an output device 38 which is configured as a detection means 40 in the form of a proximity switch in the embodiment shown. The output device 38, i.e. the proximity switch or the detection means 40, has a binary output interface 42 which is connected in a signal-transmitting manner to the binary input interface 36 of the first field device 34, i.e. the control head 14 by means of a unidirectional connection 44.

The binary input interface 36 of the first field device 34, i.e. of the control head 14, may comprise a voltage connection, a ground connection and a signal input via which the binary input interface 36 will receive the binary, discrete-time signal. The voltage connection may be a 24V connection via which the output device 38 is supplied with an operating voltage, the ground connection providing the reference potential.

The proximity switch or the detection means 40 is assigned to a further transducer 46 which is arranged on a further valve component 48 of the process valve 12, for example on a further moving valve component, such that the location of the further transducer 46 changes accordingly with the position of the further valve component 48 of the process valve 12, which is detected by the detection means 40 or the output device 38, namely in the form of a sensor value 50.

The sensor value 50 may represent an analogue measured value, i.e. an analogue value, for example a current value, a voltage value or a frequency value. The output sensor value 50 depends on the position of the process valve 12, in particular on the position of the further valve component 48.

The output device 38 or the detection means 40 further includes a signal processing module 52 which converts the sensor value 50, i.e. the data set to be transmitted, to a binary, discrete-time signal which can be transmitted via the binary output interface 42 to the binary input interface 36 of the first field device 34 or the control head 14.

To this end, the signal processing module 52 uses a serial protocol to convert the analogue sensor value 50 to the binary, discrete-time signal, i.e. the bit sequence.

The binary, discrete-time signal, i.e. the bit sequence is then transmitted via the unidirectional connection 44 to the binary input interface 36 which is internally connected to a further signal processing module 54 receiving the binary, discrete-time signal and converting it back to the data set, i.e. the (analogue) sensor value 50 in accordance with the serial protocol.

The signal processing module 54 may be part of the control and/or evaluation unit 28, in particular a partial area of the control and/or evaluation unit 28.

The output device 38 or detection means 40 may thus include an analogue sensor which outputs an analogue measured value. The output device 38 or detection means 40 converts the measured value generated by the analogue sensor to the binary, discrete-time signal. The analogue sensor has, for example, a current interface, in particular a 4-20-mA-interface the output value of which is converted to the binary, discrete-time signal by the signal processing module 52. Alternatively, a so-called 0-10-V-interface may be provided such that the analogue measured value corresponds to a voltage value.

In this respect, it is possible that information is transmitted according to an analogue signal to the first field device 34 or the control head 14, as the analogue sensor value in the form of the current value, the voltage value or the frequency value is converted to the binary, discrete-time signal.

The control and/or evaluation unit 28 can furthermore comprise a learning processing module 56 which is connected in a signal-transmitting manner to the displacement measurement system processing module 30 and the signal processing module 54.

The learning processing module 56 receives the data or information from the displacement measurement system processing module 30 and the signal processing module 54 of the first field device 34 or the control head 14. The learning processing module 56 processes and uses the corresponding information or data to learn the corresponding positions of the process valve 12, in particular after a first training phase.

Basically, the output device 38 or the detection means 40 may be an IO-Link device having an IO-Link interface.

The manner how a data transmission between the two devices of the system 32 takes place is discussed below with reference to FIGS. 2 and 3.

FIG. 2 shows a flow diagram which illustrates the functioning of the output device 38 or the detection means 40, in particular of the signal processing module 52.

After the start of the signal processing module 52, first the serial protocol (ser_protocol) used for encoding and the processing of the sensor value 50 (application) are initialized.

The signal processing module 52 accepts data from the processing for conversion or encoding, wherein a reduced quantity of data is involved which is referred to as data set. The encoding of the data set is then performed by the signal processing module 52 in accordance with the serial protocol, for example a simple protocol such as ASCII, as a result of which the bit sequence is generated, which is indicated by way of example by "010101". The bit sequence is then transmitted to the binary input interface 36 of the first field device 34 or the control head 14 as the binary, discrete-time signal, in that the binary, discrete-time signal is transferred via the unidirectional connection 44.

Basically, the output device 38 can also be operated in a further mode of operation, as a bidirectional IO-Link device, for example.

It is possible to switch between the aforementioned mode of operation in which the binary interface is the binary output interface 42, and the further mode of operation of the output device 38 using software. By the switching using software, it is thus possible to selectively set whether the device is operated as an output device 38 having the binary output interface 42 or as a bidirectional IO-Link device.

In the further mode of operation, the processing of the signal processing module 52 may also receive data, in particular from other IO-Link devices. For this purpose, the data are encoded and decoded in accordance with the IO-Link protocol. This communication takes place using an IO-Link master, for example. The binary input interface 36 is for example not suitable therefor, as it can only process binary signals.

FIG. 3 shows a flow diagram which illustrates the functioning of the first field device 34 or the control head 14, in particular of the signal processing module 54.

After the start of the signal processing module 54, the binary input interface 36 (bin_input) and an application are initialized, in particular the software assigned to the signal processing module 54.

The bit sequence at the binary input interface 36 is received, read-in and prepared. The values are decoded in accordance with the serial protocol, which corresponds to that used by the output device 38 or the detection means 40. The decoded values are processed or transformed by the application (function 1, function 2, etc.).

In this respect, it is possible that a unidirectional transmission of information (sensor value 50) to the binary input interface 36 takes place.

To this end, the data set in the output device 38, in particular the signal processing module 52 thereof, is encoded to a digital protocol and transmitted via the unidirectional connection 44 to the first field device 34 or the control head 14 as the binary discrete-time signal. The binary discrete-time signal is decoded on the receiver side in the control head 14 or in the first field device 34 in the corresponding signal processing module 54.

As the sensor value 50 is transmitted as complex information from the output device 38, which, for example, is a feedback means, to the first field device 34, i.e. the control head 14, it is no longer necessary to position and adjust the output device 38 as precisely as possible, as the transmitted information is accordingly more complex than is still the case in the prior art, in which a very precise positioning and adjustment are required.

Basically, the sensor value 50 can correspond to a distance value between the transducer 46 and the detection means 40. Upon mounting to the process valve 12, it is thus only necessary to roughly align the detection means 40, as the distance signal present in the control head 14 can then be used for the training phase or the teaching operation similarly to the measuring signal 26 of the displacement measurement system 20 which detects the location of the valve spindle 16 in the control head 14.

Certain embodiments disclosed herein, particularly the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A valve system having a system for data transmission, wherein the valve system comprises:
a process valve having a control head and a further valve component to which a detection means is assigned, and wherein the detection means has a binary output interface, wherein the control head includes a control or evaluation unit which is connected to a binary input interface in a signal-transmitting manner, wherein the binary input interface is connected in a signal-transmitting manner to the binary output interface via a unidirectional connection, wherein the detection means includes a signal processing module which is set up to convert a data set to be transmitted to a binary, discrete-time signal in accordance with a serial protocol, and wherein the control head includes a signal processing module which is set up to convert the received binary, discrete-time signal to the data set in accordance with the serial protocol, wherein the detection means is a complex bidirectional field device that is modified or set up on software side, such that its complex interface is configured for communication with a simple initiator input, wherein the data set in the signal processing module of the detection means is encoded to a digital protocol and transmitted via the unidirectional connection to the control head as the binary, discrete-time signal, and wherein the binary, discrete-time signal is decoded in the control head in the corresponding signal processing module.

2. The valve system according to claim 1, wherein the control or evaluation unit includes the signal processing module.

3. The valve system according to claim 1, wherein the valve system includes a displacement measurement system which is associated to a valve spindle, the displacement measurement system being set up to output a measuring signal depending on a position of the process valve.

4. The valve system according to claim 3, wherein the valve system includes a control or evaluation unit which is connected in a signal-transmitting manner to the binary input interface, wherein the control or evaluation unit is set up to translate the measuring signal received from the displacement measurement system into a valve position of the process valve.

5. The valve system according to claim 4, wherein the control or evaluation unit is set up to process the measuring signal received from the displacement measurement system and the data set converted from the binary, discrete-time signal in accordance with the serial protocol.

6. A valve system having a system for data transmission, wherein the valve system comprises:
a process valve having a control head and a further valve component to which a detection means is assigned, and wherein the detection means is assigned to a transducer that is arranged on a valve component of the process valve such that a location of the transducer changes with a position of the valve component of the process valve, which is detected by the detection means, wherein the detection means has a binary output interface, wherein the control head has a binary input interface connected in a signal-transmitting manner to the binary output interface via a unidirectional connection, wherein the detection means includes a signal processing module which is set up to convert a data set to be transmitted to a binary, discrete-time signal in accordance with a serial protocol, and wherein the control head includes a signal processing module which is set up to convert the received binary, discrete-time signal to the data set in accordance with the serial protocol, wherein the detection means is a complex bidirectional field device that is modified or set up on software side, such that its complex interface is configured for communication with a simple initiator input.

* * * * *